(12) United States Patent
Wuisan et al.

(10) Patent No.: US 12,180,686 B2
(45) Date of Patent: Dec. 31, 2024

(54) WORK VEHICLE HAVING ENHANCED VISIBILITY THROUGHOUT IMPLEMENT MOVEMENT

(71) Applicant: Deere & Company, Moline, IL (US)

(72) Inventors: Giovanni A. Wuisan, Epworth, IA (US); Rachel Bruflodt, Dubuque, IA (US); Derek K. Pickett, Dubuque, IA (US); Tianshuang Gao, Peosta, IA (US); Drake A. VanDerZyl, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/304,933

(22) Filed: Apr. 21, 2023

(65) Prior Publication Data

US 2023/0340758 A1 Oct. 26, 2023

Related U.S. Application Data

(63) Continuation-in-part of application No. 17/725,749, filed on Apr. 21, 2022.

(51) Int. Cl.
*E02F 9/26* (2006.01)
*B60R 1/24* (2022.01)
(Continued)

(52) U.S. Cl.
CPC .............. *E02F 9/261* (2013.01); *B60R 1/24* (2022.01); *B60R 1/27* (2022.01); *B60R 1/28* (2022.01); *B60R 11/04* (2013.01); *E02F 9/264* (2013.01); *G06T 7/73* (2017.01); *G06V 20/56* (2022.01); *H04N 5/2628* (2013.01); *H04N 7/181* (2013.01); *E02F 3/342* (2013.01); *E02F 3/431* (2013.01); *E02F 9/0858* (2013.01); *E02F 9/205* (2013.01); *H04N 23/90* (2023.01)

(58) Field of Classification Search
CPC .... B60R 1/24; B60R 1/27; B60R 1/28; B60R 11/04; B60R 2300/105; G06T 7/73; H04N 7/181; B60K 2370/176
USPC ......................................................... 348/148
See application file for complete search history.

(56) References Cited

U.S. PATENT DOCUMENTS

9,440,591 B2 9/2016 Hendron et al.
9,712,791 B2 7/2017 Kim et al.
(Continued)

*Primary Examiner* — Christopher S Kelley
*Assistant Examiner* — Asmamaw G Tarko
(74) *Attorney, Agent, or Firm* — Gary L. Montle; Lucian Wayne Beavers; Patterson Intellectual Property Law, PC (57) ABSTRACT

A computer-implemented system and method provide visual representation of an area of interest proximate to a work vehicle (e.g., a loader) during operative movement. A first vehicle portion comprises a frame, and a second vehicle portion (e.g., front-mounted bucket) is moveable relative to the first portion, and may for example obscure the area of interest from view during at least part of a trajectory of bucket movement. At least two imaging devices are mounted on the work vehicle, at least one of which has a field of view including the area of interest at any given time throughout the trajectory of bucket movement. Image data is provided to a display unit representing the area of interest and based on inputs from one or more of the imaging devices, wherein a display of the area of interest is substantially maintained thereon throughout bucket movement.

14 Claims, 6 Drawing Sheets

(51) Int. Cl.
  B60R 1/27    (2022.01)
  B60R 1/28    (2022.01)
  B60R 11/04   (2006.01)
  G06T 7/73    (2017.01)
  G06V 20/56   (2022.01)
  H04N 5/262   (2006.01)
  H04N 7/18    (2006.01)
  E02F 3/342   (2006.01)
  E02F 3/43    (2006.01)
  E02F 9/08    (2006.01)
  E02F 9/20    (2006.01)
  H04N 23/90   (2023.01)

(56) References Cited

U.S. PATENT DOCUMENTS

| | | | |
|---|---|---|---|
| 9,871,968 B2* | 1/2018 | Husted | E02F 9/261 |
| 9,880,560 B2* | 1/2018 | Han | B60D 1/36 |
| 9,908,385 B2 | 3/2018 | Chundrlik, Jr. et al. | |
| 10,086,761 B2 | 10/2018 | Kröll et al. | |
| 10,106,072 B2* | 10/2018 | Liñan | B60Q 1/085 |
| 10,144,353 B2 | 12/2018 | Karner et al. | |
| 10,234,368 B2* | 3/2019 | Cherney | G01N 9/02 |
| 10,266,117 B2* | 4/2019 | Petzold | E02F 9/2054 |
| 10,293,752 B2* | 5/2019 | Yamashita | E02F 9/261 |
| 10,377,311 B2 | 8/2019 | Kröll et al. | |
| 10,378,162 B2 | 8/2019 | Kröll et al. | |
| 10,458,098 B2* | 10/2019 | Baeumchen | E02F 3/32 |
| 10,479,354 B2 | 11/2019 | Posselius et al. | |
| 10,519,631 B2* | 12/2019 | Forcash | G05D 1/0246 |
| 10,648,154 B2 | 5/2020 | Henn et al. | |
| 10,668,854 B2* | 6/2020 | Imaizumi | B60R 1/24 |
| 10,844,579 B2* | 11/2020 | Shin | B60R 1/27 |
| 10,907,326 B2* | 2/2021 | Olsen | B60R 11/04 |
| 11,155,210 B2 | 10/2021 | Karner et al. | |
| 11,332,009 B2 | 5/2022 | Couch et al. | |
| 2008/0309784 A1* | 12/2008 | Asari | B60R 1/28 348/222.1 |
| 2009/0022423 A1 | 1/2009 | Ehlgen et al. | |
| 2012/0127310 A1 | 5/2012 | Kim | |
| 2013/0222573 A1* | 8/2013 | Onuma | E02F 9/24 348/82 |
| 2014/0204215 A1 | 7/2014 | Kriel et al. | |
| 2014/0247352 A1 | 9/2014 | Rathi et al. | |
| 2014/0267731 A1 | 9/2014 | Izumikawa | |
| 2015/0009329 A1 | 1/2015 | Ishimoto | |
| 2015/0070498 A1* | 3/2015 | Kriel | G06V 20/58 348/148 |
| 2016/0138248 A1 | 5/2016 | Conway et al. | |
| 2017/0073935 A1* | 3/2017 | Friend | E02F 9/265 |
| 2017/0131722 A1 | 5/2017 | Hiramatsu et al. | |
| 2017/0135277 A1 | 5/2017 | Hiramatsu et al. | |
| 2018/0035050 A1 | 2/2018 | Lu et al. | |
| 2018/0319392 A1* | 11/2018 | Posselius | G01S 13/931 |
| 2018/0338087 A1* | 11/2018 | Oblak | G06F 3/04883 |
| 2019/0048559 A1* | 2/2019 | Olsen | B60R 11/04 |
| 2019/0078292 A1 | 3/2019 | Ono | |
| 2020/0181880 A1 | 6/2020 | Meyer et al. | |
| 2020/0231210 A1* | 7/2020 | Anderson | G05D 1/024 |
| 2021/0087777 A1 | 3/2021 | Kenkel et al. | |
| 2021/0206330 A1* | 7/2021 | Lee | E02F 9/261 |
| 2023/0011758 A1* | 1/2023 | Okajima | B60Q 9/008 |

* cited by examiner

WORK VEHICLE HAVING ENHANCED VISIBILITY THROUGHOUT IMPLEMENT MOVEMENT

CROSS-REFERENCES TO RELATED APPLICATIONS

This is a continuation-in-part of U.S. patent application Ser. No. 17/725,749, filed Apr. 21, 2022, and which is hereby incorporated by reference in its entirety.

FIELD OF THE DISCLOSURE

The present disclosure relates to work vehicles having moving work implements which at least obscure visibility of an operator during typical operation. More particularly, the present disclosure relates to work vehicles having a plurality of imaging devices located thereon, and image processing techniques for displaying an area of interest throughout movement of the work implement.

BACKGROUND

Work vehicles as discussed herein may generally refer to self-propelled four-wheel drive wheel loaders for reasons as further described below, but may in various embodiments apply as well to other work vehicles having work implements such as for example buckets or forks which are used to carry material from one location for discharging into a loading area such as for example associated with a truck or hopper, and more particularly which at least partially obscure a field of view for an operator during associated movements. These work vehicles may typically have tracked or wheeled ground engaging units supporting the undercarriage from the ground surface, but are not necessarily self-propelled.

There is an ongoing need in the field of such work vehicles for solutions that provide better operational awareness for the operator. One problem for the operator is that even in ideal circumstances the surroundings of the work vehicle can only be seen to a limited extent from the operator cab, and at various times throughout a trajectory of movement for a portion of the work vehicle such as for example a pivoting, telescoping, or articulating work implement (e.g., boom assembly having an attachment such as a bucket or forks) the operator's field of view of the terrain in front and/or to the sides of the work vehicle may be almost entirely obscured. While this may not be problematic for certain work vehicles, four-wheel drive loaders are illustrative examples of a work vehicle wherein at least part of an attachment traverses what otherwise would include the field of view of for an operator in front of the work vehicle with respect to a traveling direction thereof. Consequently, the operator may be unable to sufficiently identify external objects from a typical working position that are concealed by the work implement in his field of vision, including but not limited to an area being traversed and contours of a loading area for receiving a load being conveyed by the attachment.

BRIEF SUMMARY OF THE DISCLOSURE

The current disclosure provides an enhancement to conventional systems, at least in part by mounting a detection system (i.e., including a plurality of imaging devices such as cameras, lidar sensors, and the like) in association with the work vehicle in such a manner that a field of view for a predetermined area of interest in front of the work vehicle is maintained throughout a trajectory of movement for a work implement (e.g., a bucket or forks) mounted thereto.

According to a first embodiment, a method is provided for visually representing at least a first area of interest proximate to a work vehicle (e.g., a four-wheel drive loader) during operative movement thereof, wherein the work vehicle comprises a first portion comprising a frame supported by a plurality of ground engaging units, a second portion moveable relative to the first portion, and at least a first imaging device and a second imaging device mounted on the work vehicle, wherein at least one of the first and second imaging devices has a field of view including the at least first area of interest at any given time throughout the trajectory of movement of the second portion. The method in this embodiment comprises a step of selectively providing image data to a display unit representing the at least first area of interest and based on inputs from one or more of the at least first imaging device and second imaging device, wherein a display of the at least first area of interest is substantially maintained thereon throughout the trajectory of movement of the second portion.

In one exemplary aspect according to the above-referenced first embodiment, the second portion may comprise a work implement supported by and movable relative to the frame, and configured to move a working tool (e.g., a bucket) at a distal end thereof between a ground-engaging position and a maximum elevated position at opposing ends of a trajectory of movement. At least the first imaging device may be mounted in a location that remains static relative to the second portion during the movement of the working tool, with at least the second imaging device being mounted on the second portion and moving along with the second portion during the movement of the working tool. Image data provided to the display unit representing the at least first area of interest may be based at least on inputs from the first imaging device while the working tool is at the maximum elevated position, and image data provided to the display unit representing the at least first area of interest may be based at least on inputs from the second imaging device while the working tool is at the ground-engaging position.

In another exemplary aspect according to the above-referenced first embodiment and optionally other aspects as described herein, the method may include determining an area of interest to be displayed on the display unit, and processing input data from the at least first imaging device and second imaging device to generate output signals corresponding to a representative display of the determined area of interest to a display unit, wherein image display parameters associated with perimeter contours of the first area of interest, at least while the first area of interest is the determined area of interest to be displayed on the display unit, are substantially maintained throughout the trajectory of movement of the second portion of the work vehicle.

In another exemplary aspect according to the above-referenced first embodiment and optionally other aspects as described herein, the first area of interest may comprise a portion of terrain proximate the working tool while the working tool is in the ground-engaging position. Alternatively, the first area of interest may comprise threshold contours of a loading area to be cleared by the working tool during an unloading action by the work vehicle.

In another exemplary aspect according to the above-referenced first embodiment and optionally other aspects as described herein, the area of interest to be displayed on the display unit may be automatically transitioned to the first area of interest upon detecting a first predetermined work state.

In another exemplary aspect according to the above-referenced first embodiment and optionally other aspects as described herein, the method may include dynamically processing the image data based on a determined current position of the second portion along the trajectory of movement of the second portion.

For example, the method may include determining the current position of the second portion relative to the first portion in a local reference system via at least signals from one or more first kinematic position sensors mounted on the first portion of the work vehicle and one or more second kinematic position sensors mounted on the second portion of the work vehicle.

In another exemplary aspect according to the above-referenced first embodiment and optionally other aspects as described herein, the dynamic processing of the image data may comprise dynamic cropping and resizing of the image data from the respective fields of view of at least one of the plurality of imaging devices and with respect to at least the first area of interest.

In another exemplary aspect according to the above-referenced first embodiment and optionally other aspects as described herein, the method may include steps of generating and iteratively updating a plurality of models corresponding to respective positions of the second portion throughout the trajectory, wherein the dynamic processing of the input data comprising dynamic cropping and further geometric and spatial translation of the input data is performed via selection of an appropriate model based on the determined current position of the second portion.

In a second exemplary embodiment as disclosed herein, a work vehicle comprises a first portion comprising a frame supported by a plurality of ground engaging units and an operator cab, and a second portion moveable relative to the first portion, wherein at least a first area of interest is obscured via a field of view from within the operator cab during at least part of a trajectory of movement of the second portion. A plurality of imaging devices are mounted on at least first and second locations relative to the work vehicle, wherein throughout the trajectory of movement of the second portion of the work vehicle at least the first area of interest is within a respective field of view for at least one of the plurality of imaging devices. A display unit may be an onboard display unit provided within an operator cab, one or more remote display units, or both as configured to generate a display based on inputs from a controller in functional communication with the plurality of imaging devices to receive inputs therefrom, and configured to direct the performance of steps in a method according to the above-referenced first embodiment and optionally any other aspects as described in accordance therewith.

Numerous objects, features and advantages of the embodiments set forth herein will be readily apparent to those skilled in the art upon reading of the following disclosure when taken in conjunction with the accompanying drawings.

DETAILED DESCRIPTION

The implementations disclosed in the above drawings and the following detailed description are not intended to be exhaustive or to limit the present disclosure to these implementations.

Figure 1:
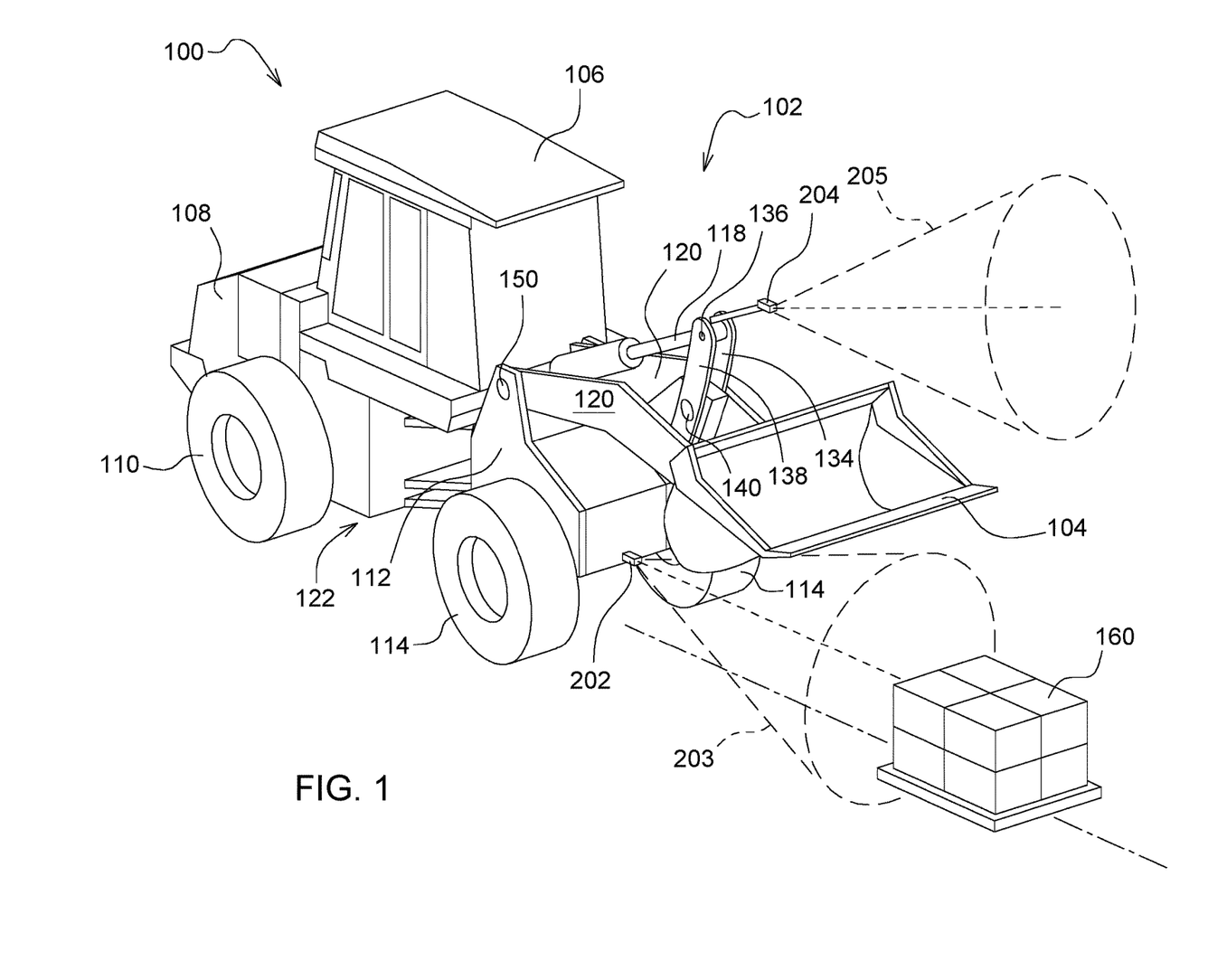
FIG. 1 is a perspective view representing an embodiment of a work vehicle as disclosed herein.

FIG. 1 in a particular embodiment as disclosed herein shows a representative work vehicle 100 in the form of, for example, a four-wheel drive loader having a front-mounted work implement 102 which includes and controllably adjusts the position of a working tool 104, such as for example a bucket which faces generally away from an operator of the work vehicle 100, for forward-scooping, carrying, and dumping dirt and other materials into a loading area such as for example a stationary bin or hopper, or a container integrated with an articulated dump truck. It is within the scope of the present disclosure that the work vehicle 100 may be in the form of various alternative equipment or vehicles, typically but not exclusively self-propelled in nature, using a work implement to modify the proximate terrain and to carry material from the terrain for loading into a loading area, and generally designed for use in off-highway environments such as a construction or forestry work site, for example. Accordingly, other examples of suitable working tools 104 within the scope of the present disclosure may include, without limitation, blades, pallet forks, bail lifts, augers, harvesters, tillers, mowers, grapples, and the like.

As represented in FIG. 1 and further for illustrative purposes in FIGS. 2A-4C, the work vehicle 100 includes an operator cab 106, a rear body portion 108 with rear ground engaging units 110 (e.g., wheels), and a front body portion 112 with front ground engaging units 114 (e.g., wheels). The work implement 102 includes a linkage for adjusting a position of the working tool 104, and a hydraulic cylinder 118 to power the linkage. The working tool 104 is rotatably coupled to boom arms 120 at respective pivot locations 142 on opposite sides of the working tool 104. The hydraulic cylinder 118 powering the linkage and the boom arm 120 provide a boom actuator that raises and lowers the work implement 102 with respect to the frame (i.e., at least including the rear body portion 108 and front body portion 112 of the work vehicle 100.

An articulation joint 122 in an embodiment may enable angular adjustment of the rear body portion 108 with respect to the front body portion 112. Hydraulic cylinders 124, 126, 128 enable angular changes between the rear and front body portions 108 and 112 under hydraulic power derived from conventional hydraulic pumps (not shown).

A user interface 212 (represented in FIG. 5) may be located within the operator cab 106 for use by an operator of the work vehicle 100. The user interface 212 may include or otherwise be functionally linked to one or more corresponding user interface tools 216 for input and/or output with respect to a controller 210 as further described below. Such user interface tools 216 may for example include a plurality of user selectable touch buttons (e.g., soft buttons), to select from a plurality of commands or menus, each of which may be selectable through a touch screen having a display unit 214. Touch buttons respond to touch and do not include a mechanical component requiring a force sufficient to engage mechanical features. The touch screen may be a graphical user interface configured to display icons as well as content of work vehicle applications. The display unit 214 may be configured to display in the touch screen still images, moving images, and video content through one or more different types of displays. The display unit 214 may include, but is not limited, to cathode ray tube (CRT) displays, light-emitting diode (LED) displays, and liquid crystal displays (LCD).

Such an onboard user interface 212 may be provided as part of or otherwise functionally linked to a vehicle control system 200 via for example a CAN bus arrangement or other equivalent forms of electrical and/or electro-mechanical signal transmission. Another form of user interface (not shown) may take the form of a display unit that is generated on a remote (i.e., not onboard) computing device, which may display outputs such as status indications and/or otherwise enable user interaction such as the providing of inputs to the system. In the context of a remote user interface, data transmission between for example the vehicle control system 200 and the user interface may take the form of a wireless communications system and associated components as are conventionally known in the art.

The user interface 212 may further include, or as may be as separately defined with respect to operator-accessible interface tools, an accelerator pedal which enables the operator to adjust the speed of the vehicle. In other embodiments, a hand lever provides this function. Other exemplary tools residing in or otherwise accessible from the operator cab 106 may include a steering wheel, a plurality of operator selectable touch buttons configured to enable the operator to control the operation and function of the work vehicle 100, and any accessories or implements being driven by the powertrain of the work vehicle, including for example the working tool 104.

As used herein, directions with regard to work vehicle 100 may be referred to from the perspective of an operator seated within the operator cab 106; the left of the work vehicle 100 is to the left of such an operator, the right of the work vehicle is to the right of such an operator, a front-end portion (or fore) 112 of the work vehicle 100 is in the direction such an operator faces, a rear-end portion (or aft) 108 of the work vehicle 100 is behind such an operator, a top of the work vehicle 100 is above such an operator, and a bottom of the work vehicle 100 below such an operator.

Figures 2A, 2B, 2C:
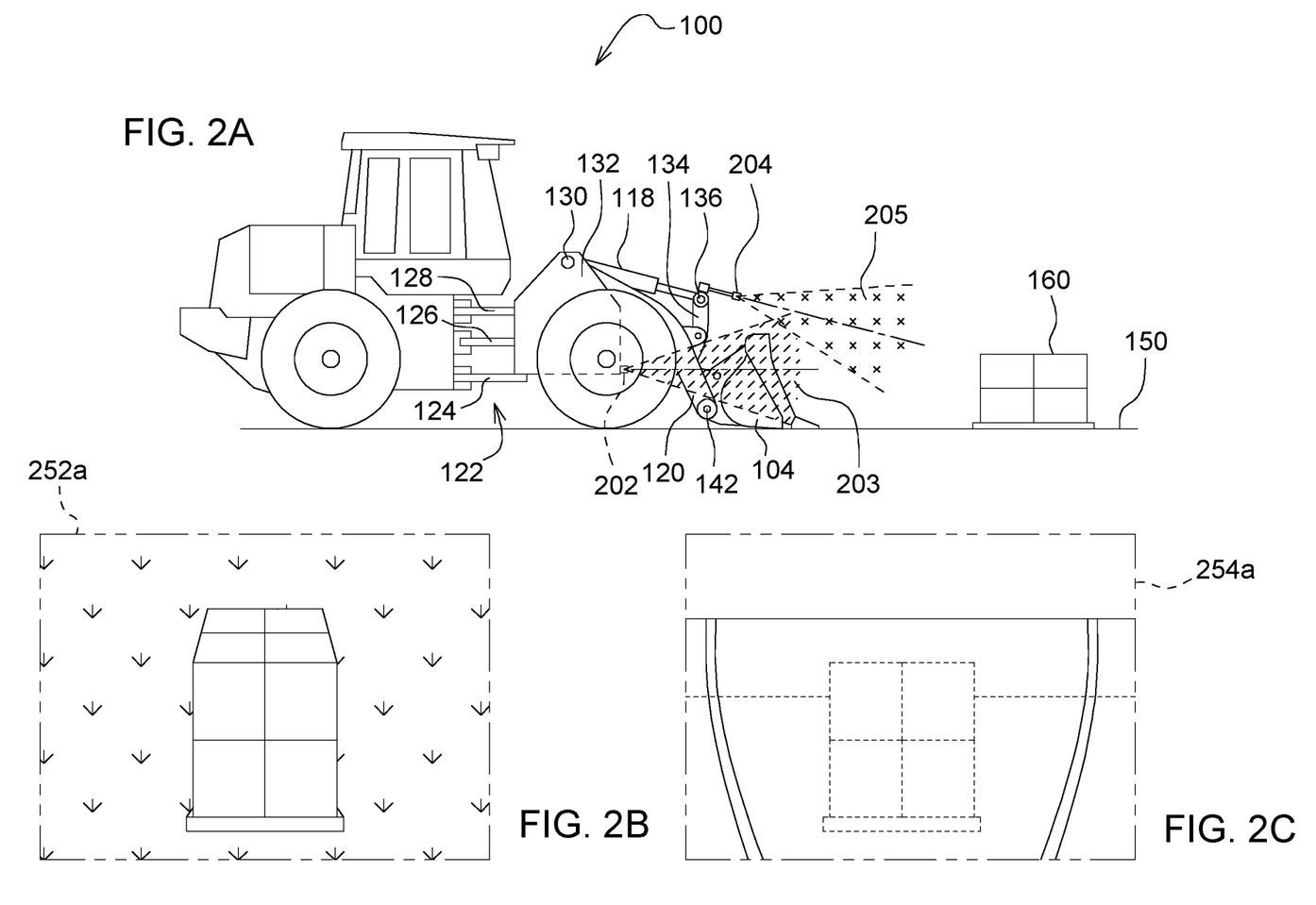
FIG. 2A is a side view representing the work vehicle of FIG. 1 with the working tool in a first position.
FIG. 2B is a perspective view representing an area of interest from the field of view of a first imaging device on the work vehicle with the working tool in the first position.
FIG. 2C is a perspective view representing an area of interest from the field of view of a second imaging device on the work vehicle with the working tool in the first position.

As illustrated in FIG. 2A, the work implement 102 is in a fully lowered position with respect to the ground surface 150. In this position, the working tool 104 is set to a level position with the ground surface 150 such that a plane defined by a bottom portion of the bucket is substantially flush with the ground and is substantially horizontal. For the purposes of this disclosure, the position of the work implement 102 and of the working tool 104 as shown in FIG. 2A is considered to be a fully lowered position, or alternatively stated a first position along an available trajectory of the work implement 102 and/or working tool 104. The linkage, under some conditions, is capable of being lowered further than the illustrated position of FIG. 2A if the surface of the ground beneath the working tool 104 is lower than the surface of the ground engaging units 110, 114 upon which the work vehicle 100 is located. One end of the arm 120 is operatively connected to the working tool 104 at the pivot location 142 and another end of the arm 120 is operatively connected to a pivot location 130 associated with a frame structure 132.

The working tool 104 may be adjustable with respect to the boom arm 120 by activation of the cylinder 118 having one end coupled to a portion of the work vehicle 100, as is understood by one skilled in the art, and at another end thereof operatively connected to an implement link 134. The implement link 134 is rotatably coupled to an end of the cylinder 118 at a pivot location 136. Another end of the implement link 134 is rotatably coupled to a portion of the working tool 104 at a pivot location (not shown). An intermediate portion 138 of the implement link 134 is rotatably coupled to a flange 140 fixedly connected to the arm 120. Extension and retraction of the hydraulic cylinder 118 rotates the working tool 104 about the pivot location 142. The hydraulic cylinder 118 and the implement link 134 provide an implement actuator to move the working tool 104 with respect to the boom arm 120.

Figure 5:
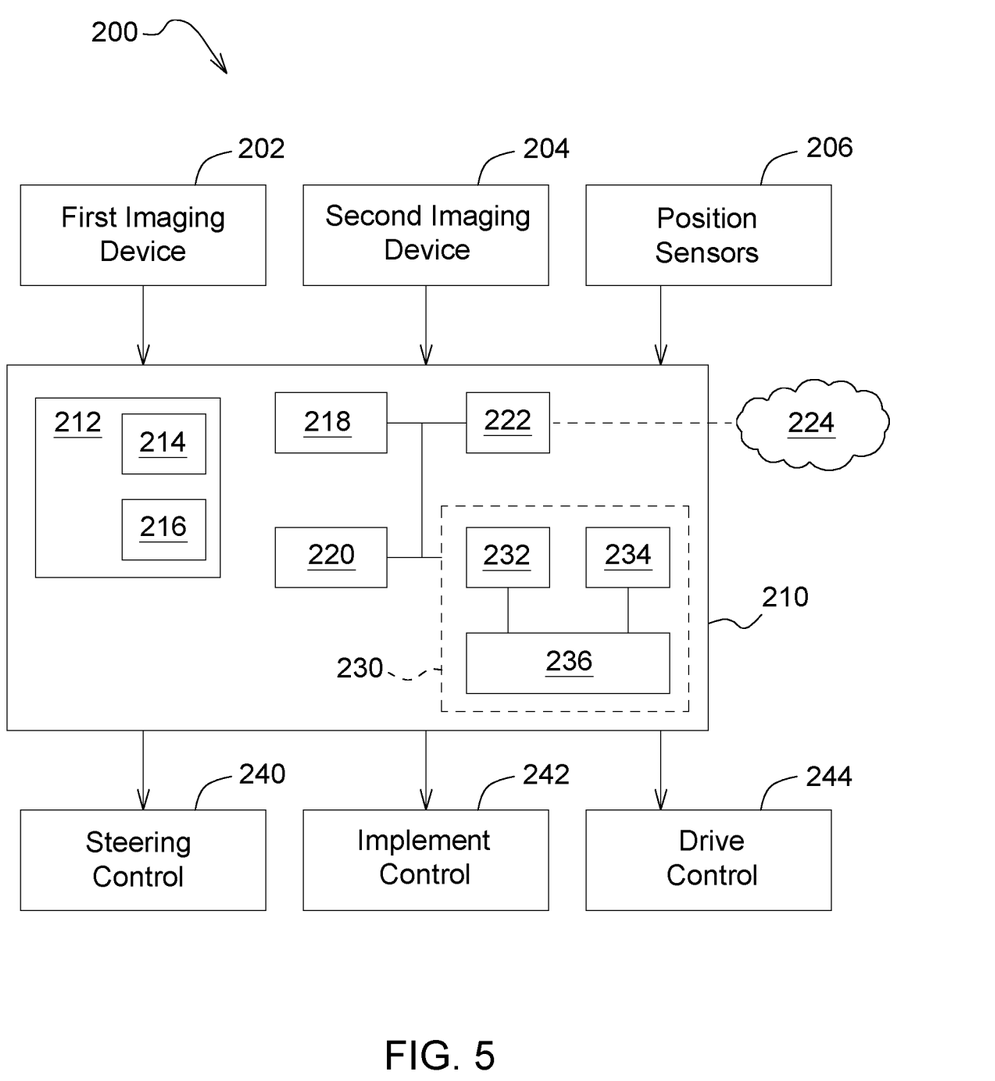
FIG. 5 is a block diagram representing an embodiment of a control system according to the present disclosure.

One or more kinematic sensors 206 (as represented in FIG. 5 but not shown in FIG. 2A) may include a sensor located at or near one or more of the above-referenced pivot locations, for example to determine an angle of rotation of the arm 120 with respect to the frame 132. In one embodiment, a sensor 206 may be operatively connected to the arm 120 by a four bar linkage as is understood by one skilled in the art. In another embodiment, a sensor 206 may be located at the pivot location 130. As the hydraulic cylinder 118 extends and retracts, the arm 120 is raised and lowered with respect to the ground surface 150. Another sensor 206 may be located at or near a pivot axis of the implement link 134 with respect to the flange 140. As the hydraulic cylinder 118 extends and retracts, the working tool 104 rotates about the axis of pivot location 142. An output of a first sensor 206 may be used for example to determine a height of the working tool 104 with respect to the ground surface 150 and an output of another sensor 206 may be used to determine the inclination of the working tool 104 with respect to the arm 120.

Also as illustrated in FIGS. 1-4C, a first imaging device 202 is provided at a first (e.g., lower) position on the work vehicle 100 and a second imaging device 204 is provided at a second (e.g., upper) position on the work vehicle 100 and relative to the first imaging device 202. In various embodiments, more than two imaging devices (not shown) may be provided for the work vehicle 100 and implemented along-side or substituted for one or more of the first imaging device 202 and the second imaging device 204 within the scope of the present disclosure.

In the embodiment as shown, the first imaging device 202 is located on or proximate to an axle of the work vehicle 100 and remains in a fixed position relative to the frame 132 of the work vehicle 100 regardless of relative movement of the work implement 102 thereto. As elsewhere described herein, a "first" portion of the work vehicle 100 may refer to a portion associated with the frame 132 or otherwise in a fixed position relative to the frame 132, and with respect to which the first (lower) imaging device 202 is mounted.

Further in the embodiment as shown, the second imaging device 204 is located on or proximate to the hydraulic cylinder 118, for example at or proximate to the pivot location 136, and moves relative to the frame 132 of the work vehicle 100 along with movement of the work implement 102. As elsewhere described herein, a "second" portion of the work vehicle 100 may refer to a portion associated with the work implement 102 or otherwise movable along with or corresponding with movement of the work implement 102 relative to the frame 132, and with respect to which the second (upper) imaging device 204 is mounted. Positioning of the upper imaging device 204 on the work implement 102 may generally be preferred over positioning of the upper imaging device 204 on an elevated and static portion of the work vehicle 100 such as for example atop the operator cab 106, at least because the field of view 205 in this context is only moderately improved over the field of view from within the operator cab itself, and significantly more obscured by the work implement 102 at most if not all stages of the available trajectory of movement thereof.

It may be appreciated that locations for the first imaging device 202 and the second imaging device 204 are not limited to those illustrated in the figures, and various alternatives may be used for the purposes described in more detail below and within the scope of the present disclosure. For example, in an embodiment the lower imaging device 202 may be mounted to a bottom portion of the work implement 102 (e.g., a bucket link mount) such that raising of the work implement 102 presents a field of view 203, or a third imaging device 202 may be mounted to a bottom portion of the work implement 102 (e.g., a bucket link mount) such that raising of the work implement 102 presents an additional field of view for stitching together with field of view 203 when the work implement 102 is sufficiently raised. A fourth imaging device 202 may in an embodiment be provided for example on top of the operator cab 206 to present another field of view for stitching together with field of view 205 when the work implement 102 is sufficiently lowered, or for use if for example imaging device 204 becomes non-functional or otherwise unavailable.

The first imaging device 202 and the second imaging device 204 may be cameras arranged to capture images corresponding to at least respective fields of view 203, 205. One or more of the imaging devices 202, 204 may include video cameras configured to record an original image stream and transmit corresponding data to the controller 210. In the alternative or in addition, the one or more of the imaging devices 202, 204 may include one or more of a digital (CCD/CMOS) camera, an infrared camera, a stereoscopic camera, a PMD camera, a time-of-flight/depth sensing camera, high resolution light detection and ranging (LiDAR) scanners, radar detectors, laser scanners, and the like within the scope of the present disclosure. An orientation and/or location of the imaging devices 202, 204 may vary in accordance with the type of work vehicle 100 and relevant applications. Other imaging devices, supplementing or otherwise substituting for the imaging devices 202, 204, in possible embodiments within the scope of the present disclosure may incorporate radar, lidar, etc. The imaging devices 202, 204 may in some embodiments be further or otherwise implemented for detecting and/or classifying the surroundings of the work vehicle 100, and various examples of which in addition or alternatively with respect to cameras may include ultrasonic sensors, laser scanners, radar wave transmitters and receivers, thermal sensors, structured light sensors, other optical sensors, and the like. The types and combinations of imaging devices in these contexts may vary for a type of work vehicle, work area, and/or application, but generally may be provided and configured to optimize recognition and classification of a material being loaded and unloaded, and work conditions corresponding to at least these work states, at least in association with a determined working area (loading, unloading, and associated traverse) of the work vehicle 100 for a given application.

In an embodiment, either or both of the imaging devices 202, 204 may include an ultra-wide-angle lens (e.g., a "fish-eye" lens) having a sufficiently broad field of view to capture an area of interest at any position along an available trajectory of movement (if any) of a component upon which the imaging device 204 is mounted, and to provide image data comprising the area of interest projected on a plane for image data processing functions as further described elsewhere herein. Either or both of the imaging devices 202, 204 may be provided with a zoom lens such that the field of view and correspondingly the output image data from a respective imaging device compensates, e.g., for movement of the position of the imaging device relative to the area of interest. Such an embodiment may eliminate or at least reduce the need for data processing downstream of the imaging device to resize the field of view, for example where the scale of the resultant image may otherwise vary depending on the relative heights of the imaging devices as they transition there between during operation as further described below.

In an embodiment, it may be contemplated that the upper imaging device 204 is provided with a moveable/rotatable mount such that the field of view 205 is dynamic to correspond as much as possible with an area of interest throughout movement of the component upon which the upper imaging device 204 is mounted for at least the portion of the trajectory in which the image data from the upper imaging device 204 is selected or otherwise during which the imaging device 204 is activated.

It may of course be understood that one or more of the preceding embodiments with respect to the first and/or second imaging devices 202, 204 may be combined to provide corresponding features for a method as described below. For example, a zoom lens may be provided along with a panning base such that either or both of the imaging devices are continuously directed as much/as long as possible to the same area of interest throughout movement of the work implement 102.

One of skill in the art may appreciate that image data processing functions may be performed discretely at a given imaging device 202, 204 if properly configured, but most if not all image data processing may generally be performed by the controller 210 or other downstream data processor. For example, image data from either or both of the imaging devices 202, 204 may be provided for three-dimensional point cloud generation, image segmentation, object delineation and classification, and the like, using image data processing tools as are known in the art in combination with the objectives disclosed.

With further reference to FIG. 5, the controller 210 may be configured to receive inputs from some or all of various data sources such as the first imaging device 202, the second imaging device 204, one or more kinematic sensors 206, and further (not shown) object detecting sensors, onboard payload sensors, onboard work state sensors, and external data sensors such as for example from a remote computing device, the user interface, and/or a machine control system for the work vehicle 100 if separately defined with respect to the controller 210. Hydraulic pressure sensors may provide pressure input indicative of, for example, hydraulic pressure in one side of, e.g., hydraulic cylinder 118 of the work implement 102 assembly. Other sensors providing input to the controller 210 may for example include sensors coupled to piston-cylinder units to detect the relative hydraulically actuated extensions thereof, imaging devices, and/or any known alternatives as may be known to those of skill in the art to provide position or movement input indicative of a position (e.g., angular position or displacement) or movement (e.g., angular velocity or acceleration) of one or more components of the work implement 102 and/or working tool 104.

As one example, work state estimation sensors in functional communication with the controller 210 where the work vehicle 100 is a four-wheel drive loader may include wheel-based vehicle speed sensors or transmission output speed sensors, position (e.g., kinematic) sensors 206 associated with the work implement 102 and/or working tool 104, load sense pressure sensors, engine speed sensors, engine torque sensors, and/or any known alternatives as may be known to those of skill in the art. The work state estimation sensors may be directly coupled to respective components to generate signals representing wheel speed, position, load, engine speed, engine torque, and the like, or in some embodiments some or all of these variables may be predicted or estimated from signals generated by sensors or other data sources indirectly corresponding thereto. In some embodiments, one or more of the work state estimation sensors as referenced above may be replaced by monitored inputs from a user interface, corresponding for example to a commanded or otherwise intended value for a corresponding variable as an input to the work state estimation logic.

In an embodiment, position sensors 206 may include kinematics sensors for tracking a position of the upper imaging device 204 relative to a predetermined area of interest, a relative position of the work implement 102 relative to the frame 132, a component within the work implement 102 relative to another component therein, and/or the like. Kinematics sensors may be provided in the form of inertial measurement units (each, an IMU), which for example include a number of sensors including, but not limited to, accelerometers, which measure (among other things) velocity and acceleration, gyroscopes, which measure (among other things) angular velocity and angular acceleration, and magnetometers, which measure (among other things) strength and direction of a magnetic field. Generally, an accelerometer provides measurements, with respect to (among other things) force due to gravity, while a gyroscope provides measurements, with respect to (among other things) rigid body motion. The magnetometer provides measurements of the strength and the direction of the magnetic field, with respect to (among other things) known internal constants, or with respect to a known, accurately measured magnetic field. The magnetometer provides measurements of a magnetic field to yield information on positional, or angular, orientation of the IMU; similarly to that of the magnetometer, the gyroscope yields information on a positional, or angular, orientation of the IMU. Accordingly, the magnetometer may be used in lieu of the gyroscope, or in combination with the gyroscope, and complementary to the accelerometer, in order to produce local information and coordinates on the position, motion, and orientation of the IMU.

In another embodiment, non-kinematic sensors may be implemented for position detection, such as for example markers or other machine-readable components that are mounted or printed on the work vehicle 100 and within the field of view of either or both of the imaging devices 202, 204. In one example, April tags or an equivalent may be provided such that, depending on how the marker appears within the field of view of the upper imaging device 204, data processing elements may calculate a distance to the marker and/or orientation of the marker relative to the imaging device 204 for spatially ascertaining the position of the imaging device 204. As another example, machine learning techniques may be implemented based on inputs for two or more known components of the work vehicle 100 such as a front cab mount and a rear mudguard, such that the data processing units can spatially ascertain a position of the imaging device 204 based on a distance between the two or more components and their respective positions in the field of view of the imaging device 204.

A controller 210 for the above-referenced purposes may be embodied by or include a processor 218 such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general-purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The controller may further generate control signals for controlling the operation of respective actuators, or signals for indirect control via intermediate control units, associated with a work vehicle steering control system 240, a work implement control system 242, and/or a work vehicle drive control system 244. The controller 210 may for example generate control signals for controlling the operation of various actuators, such as hydraulic motors or hydraulic piston-cylinder units, and electronic control signals from the controller 210 may actually be received by electro-hydraulic control valves associated with the actuators such that the electro-hydraulic control valves will control the flow of hydraulic fluid to and from the respective hydraulic actuators to control the actuation thereof in response to the control signal from the controller 210.

The controller 210 further communicatively coupled to a hydraulic system as work implement control system 242 may accordingly be configured to operate the work vehicle 100 and operate a work implement 102 coupled thereto, including, without limitation, a lift mechanism, tilt mechanism, roll mechanism, pitch mechanism and/or auxiliary mechanisms, for example and as relevant for a given type of work implement or work vehicle application.

The controller 210 further communicatively coupled to a hydraulic system as steering control system 240 and/or drive control system 244 may be configured for moving the work vehicle 100 in forward and reverse directions, moving the work vehicle left and right, controlling the speed of the work vehicle's travel, etc. The drive control system 244 may be embodied as, or otherwise include, any device or collection of devices (e.g., one or more engine(s), powerplant(s), or the like) capable of supplying rotational power to a drivetrain and other components, as the case may be, to drive operation of those components. The drivetrain may be part of the drive control system 244 or may for example be embodied as, or otherwise include, any device or collection of devices (e.g., one or more transmission(s), differential(s), axle(s), or the like) capable of transmitting rotational power provided by the drive control system 244 to the ground engaging units 110, 114 to drive movement of the work vehicle 100.

The controller 210 may include, in addition to the processor 218, a computer readable medium 220, a communication unit 222, data storage 230 such as for example being or otherwise including a database network, and the aforementioned user interface 212 or control panel having a display 214. It may be understood that the controller 210 described herein may be a single controller having all of the described functionality, or it may include multiple controllers wherein the described functionality is distributed among the multiple controllers.

Various operations, steps or algorithms as described in connection with the controller 210 can be embodied directly in hardware, in a computer program product such as a software module executed by the processor 218, or in a combination of the two. The computer program product can reside in RAM memory, flash memory, ROM memory, EPROM memory, EEPROM memory, registers, hard disk, a removable disk, or any other form of computer-readable medium 220 known in the art. An exemplary computer-readable medium 220 can be coupled to the processor 218 such that the processor 218 can read information from, and write information to, the memory/storage medium 220. In the alternative, the medium 220 can be integral to the processor 218.

The communication unit 222 may support or provide communications between the controller 210 and external systems or devices, for example via a wireless communications network 224, and/or support or provide communication interface with respect to internal components of the work vehicle 100. The communications unit may include wireless communication system components (e.g., via cellular modem, WiFi, Bluetooth or the like) and/or may include one or more wired communications terminals such as universal serial bus ports.

The data storage 230 as discussed herein may, unless otherwise stated, generally encompass hardware such as volatile or non-volatile storage devices, drives, memory, or other storage media, as well as one or more databases residing thereon. In a particular embodiment as illustrated, the data storage 230 may for example have stored thereon image data 232 from at least the first imaging device 202 and the second imaging device 204, position data 234 from at least the position sensors 206, and one or more models 236 developed for correlating the image data 232 and the position data 234 with respect to work states, areas of interest, obstructions to the fields of view for respective imaging devices relative to an area of interest, etc. Data storage 230 may in some embodiments include data storage physically located elsewhere from the work vehicle 100 and controller 210 and can include any cache memory in a processing device, as well as any storage capacity used as a virtual memory, e.g., as stored on a mass storage device or another computer coupled to the controller 210. The mass storage device can include a cache or other dataspace which can include databases. Data storage, in other embodiments, is located in the "cloud", where the memory is located at a distant location which provides the stored information wirelessly to the controller 210.

As noted above with respect to FIG. 2A, the work implement 102 is in a fully lowered position with respect to the ground surface 150, or alternatively stated a first position along an available trajectory of the work implement 102 and/or working tool 104. As illustrated in FIG. 2B, an exemplary display image 252a corresponding to a field of view 205 for the upper imaging device 204 will have a clear view of an area of interest such as for example including object 160 lying on the ground in front of the work vehicle 100 or otherwise the threshold contours that need to be cleared for a loading area such as may be associated with the container of an articulated dump truck in front of the work vehicle 100. As further illustrated in FIG. 2C, in contrast, an exemplary display image 254a corresponding to a field of view 203 for the lower imaging device 202 will be substantially obscured by the working tool 104, as represented by the dashed line contours of the object 160 which would not be visible.

Figure 3A:
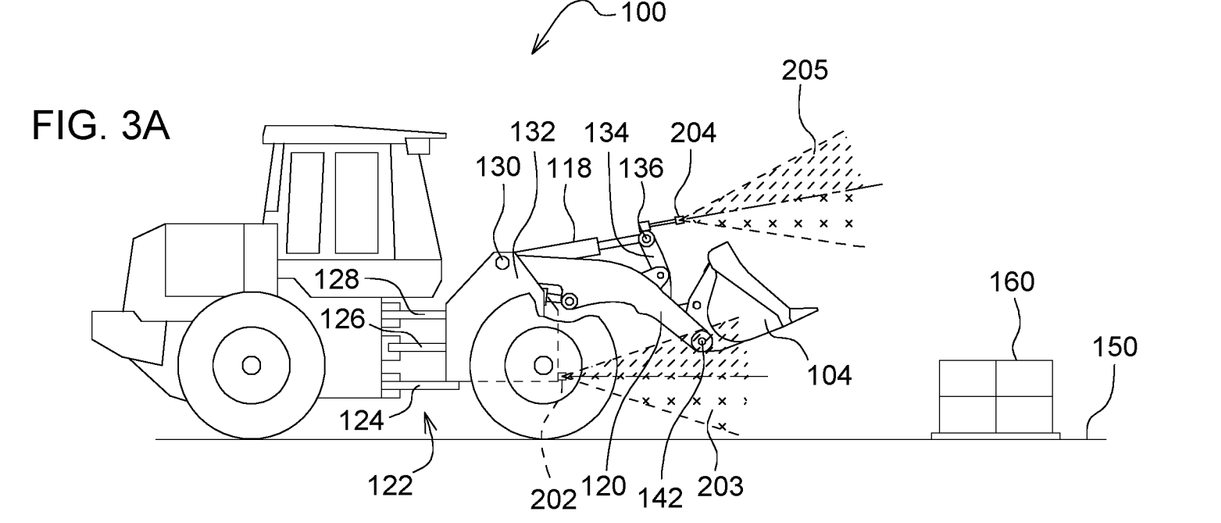
FIG. 3A is a side view representing the work vehicle of FIG. 1 with the working tool in a second position.
Figure 3B:
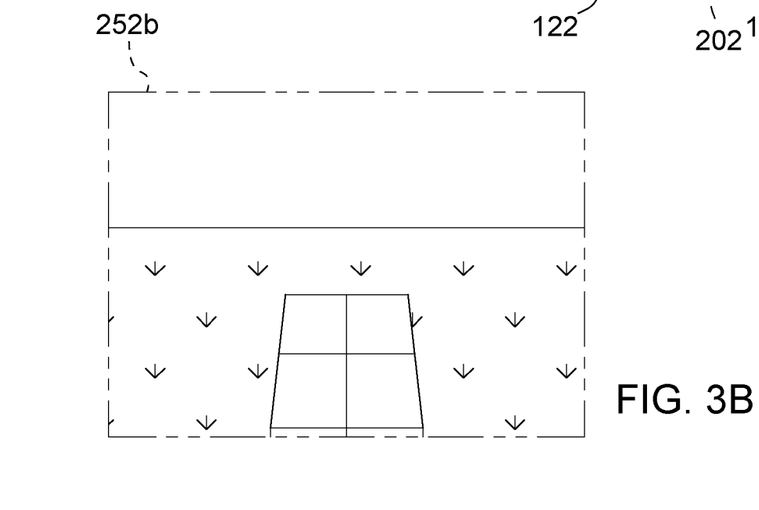
FIG. 3B is a perspective view representing an area of interest from the field of view of the first imaging device on the work vehicle with the working tool in the second position.
Figure 3C:
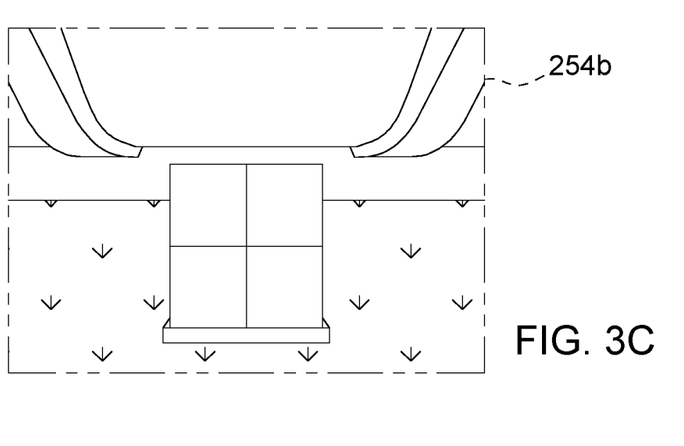
FIG. 3C is a perspective view representing an area of interest from the field of view of the second imaging device on the work vehicle with the working tool in the second position.

Further by illustrative reference to FIG. 3A, the work implement 102 as shown is in a partially lowered/raised position with respect to the ground surface 150, or alternatively stated an intermediate position between opposed first and second positions along an available trajectory of the work implement 102 and/or working tool 104. As illustrated in FIG. 3B, an exemplary display image 252b corresponding to the field of view 205 for the upper imaging device 204 may still have at least a partial view of an area of interest, depending for example on the selected area of interest and the degree of movement by the work implement 102 along the available trajectory. As shown in FIG. 3C, an exemplary display image 254b corresponding to the field of view 203 for the lower imaging device 202 may also have at least a partial view of an area of interest, depending for example on the selected area of interest and the degree of movement by the work implement 102 along the available trajectory.

As the work implement 102 and the imaging device 204 are raised along the available trajectory of movement, these components do not merely elevate but also pivot in orientation relative to the ground surface 150. Accordingly, in various embodiments the imaging device 204 may be positioned and oriented so as to capture an area of interest throughout at least part of the pivoting motion of the work implement 102, even if this means that the area of interest starts in one portion of the field of view 205 and ends up in another portion of the field of view 205. The imaging device 204 may be selected based on the type of work vehicle 100 and/or desired area of interest to have a sufficiently wide angle for its field of view 205, depending for example on the amount of available movement for the work implement 102. In various embodiments, the imaging device 204 may be mounted to the work implement 102 via an elongated component or otherwise a component that is controllably dynamic in orientation to permit the imaging device 204 a field of view 205 encompassing a broader range of areas of interest throughout the available trajectory of movement of the work implement 102.

Figure 4A:
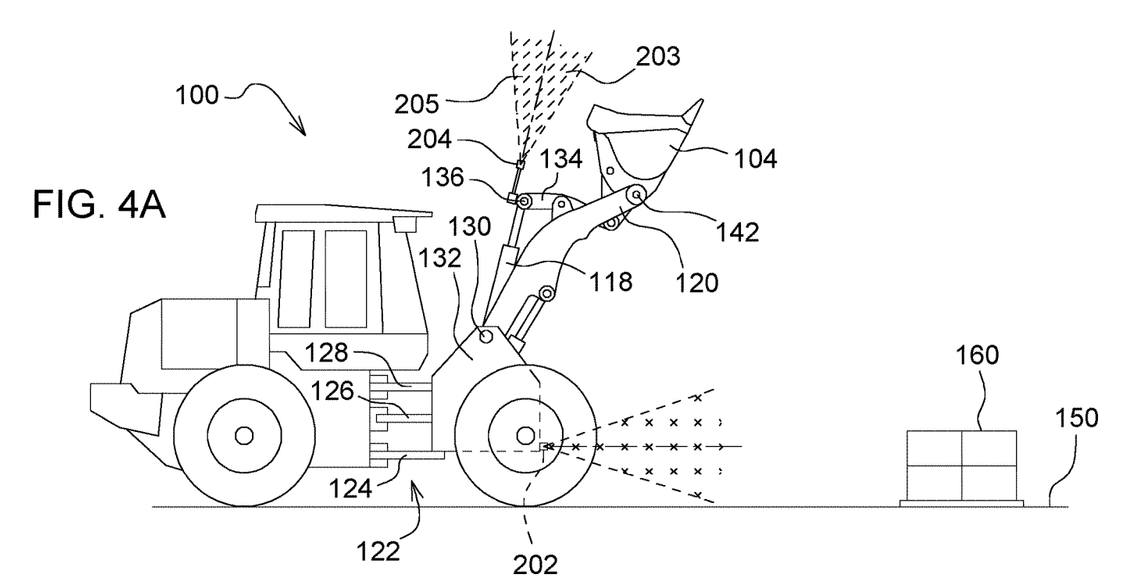
FIG. 4A is a side view representing the work vehicle of FIG. 1 with the working tool in a third position.
Figure 4B:
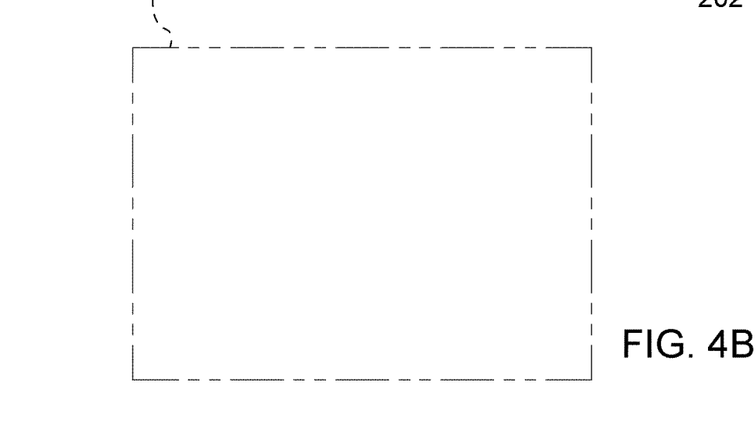
FIG. 4B is a perspective view representing an area of interest from the field of view of the first imaging device on the work vehicle with the working tool in the third position.
Figure 4C:
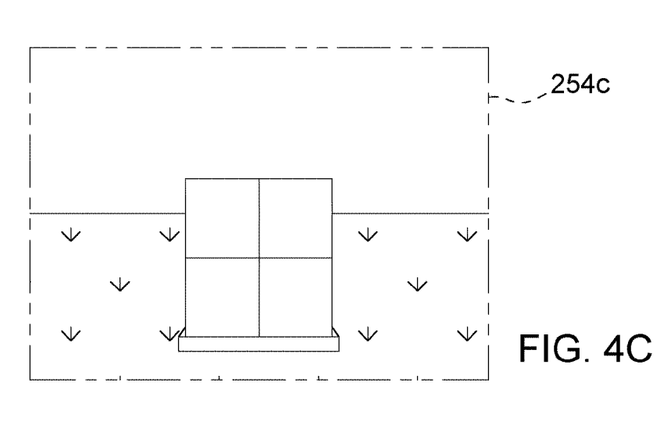
FIG. 4C is a perspective view representing an area of interest from the field of view of the second imaging device on the work vehicle with the working tool in the third position.

Still further by reference to FIG. 4A, the work implement 102 is in a fully raised position with respect to the ground surface 150, or alternatively stated a second position opposed to the aforementioned first (fully lowered) position along the available trajectory of the work implement 102 and/or working tool 104. As illustrated in FIG. 4B, an exemplary display image 252c corresponding to the field of view 205 for the upper imaging device 204 will have no clear view of any area of interest, as the imaging device 204 is substantially oriented to be pointing upward in this pose. As further illustrated in FIG. 4C, in contrast, an exemplary display image 254c corresponding to a field of view 203 for the lower imaging device 202 will have a clear view of an area of interest such as for example including object 160 lying on the ground in front of the work vehicle 100 or otherwise the contours of a loading area such as may be associated with the container of an articulated dump truck in front of the work vehicle 100.

Figure 6:
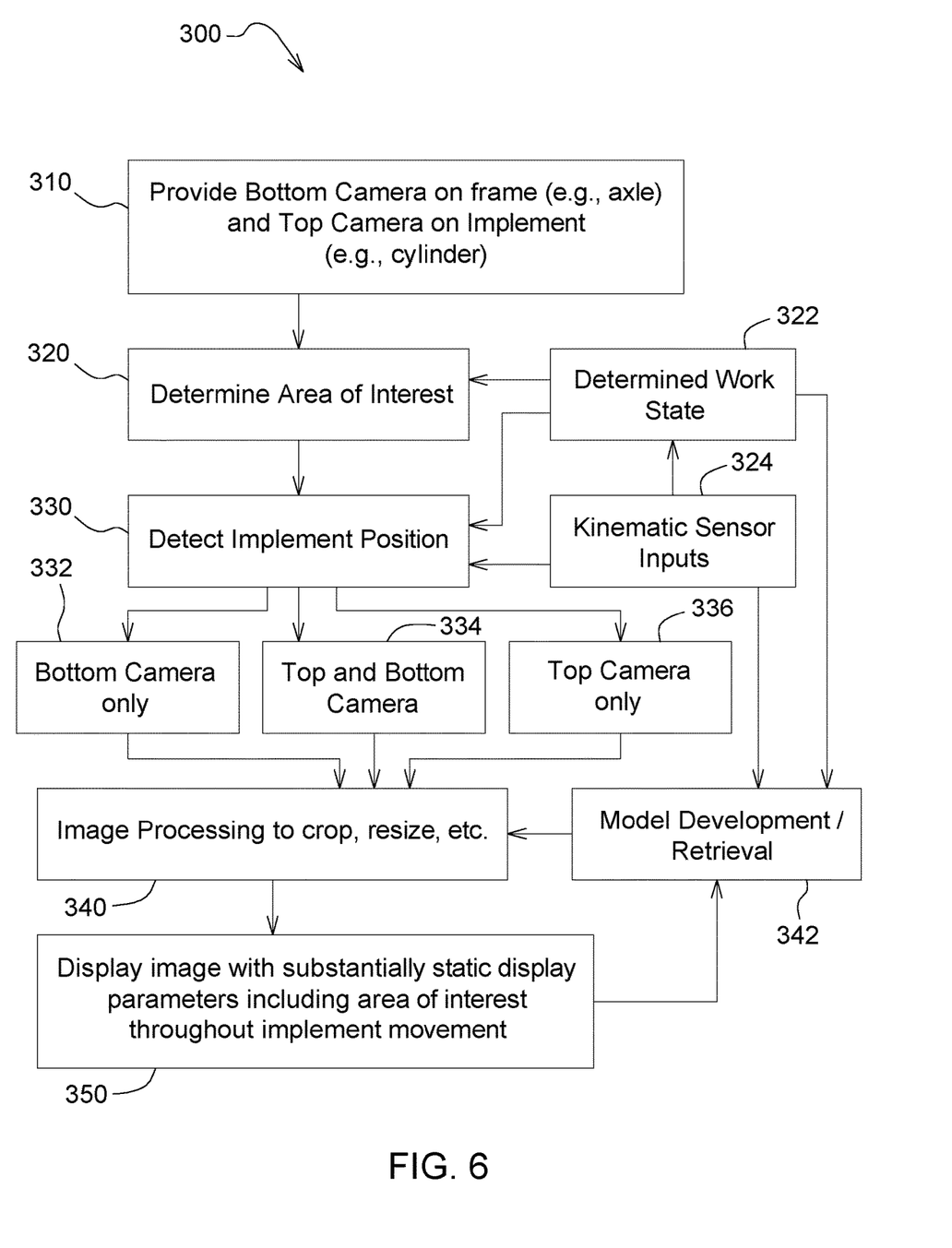
FIG. 6 is a flowchart representing an embodiment of a method according to the present disclosure.

Referring now to FIG. 6 for illustrative purposes, an embodiment of a method 300 according to the present disclosure may now be described regarding visually representing at least a first area of interest proximate to a work vehicle during operative movement thereof, for example with respect to a work vehicle 100 as described above. While an embodiment as discussed herein and with reference to the illustrated work vehicle 100 in FIG. 1 may typically represent an area of interest forward of the work vehicle, in other embodiments for example utilizing alternative work vehicles the area of interest may be in other directions and obscured by the movement of respective work implements in these other directions.

The method 300 may for example be executed by the above-referenced controller 210, alone or in at least partial combination with separate components of a vehicle or machine control unit, mobile user devices, and/or distributed computing elements such as for example in a cloud computing environment.

The illustrated method 300 may begin with a step 310, which may be appreciated as a preliminary step in many cases that is performed only periodically and not with each or even most iterations of the method 300, of providing a first (e.g., lower) imaging device on the frame (e.g., axle) of the work vehicle and a second (e.g., upper) imaging device on the work implement (e.g., on the hydraulic cylinder 118) or otherwise a portion of the work vehicle that is at least partially movable along with or corresponding to movement of the work implement.

In another step 320, the method 300 includes determining an area of interest to be monitored and displayed to the operator.

In an embodiment, the area of interest may be predetermined, wherein the step 320 of determining the area of interest may be moot for at least a particular embodiment, project, work cycle, or the like.

In an embodiment, the area of interest may be determined based on user input, for example by receiving input signals from the user interface which identify an area from an image generated based on prior inputs from one or more of the imaging devices provided in step 310.

In an embodiment, the area of interest may be determined at least in part based on a determined work state (step 322) for the work vehicle. The work state may be determined based at least in part on work vehicle operating parameters such as travel speed or engine torque, user-initiated commands, and/or detected positions and/or orientations of the work vehicle frame, the work implement, the working tool, and/or the like. As one example, it may be determined that a current or predicted work state corresponds to loading of material from the ground surface within a bucket as the working tool, or picking up a pallet on the ground with forks as the working tool, wherein the area of interest may be directed to a corresponding region at ground level and in front of the work vehicle 100. As another example, it may be determined that a current or predicted work state corresponds to unloading of material from within the bucket into a container having an elevated rim, or depositing a pallet onto an elevated surface of a flatbed transport vehicle, wherein the area of interest may be directed to a corresponding region at a specified elevation above ground level and in front of the work vehicle 100. Other examples may of course be relevant based on the type of work vehicle, the type of work implement or working tool attached thereto, etc.

Work state detection and corresponding transitions there between may in an embodiment be treated a classical sequence classification problem, addressed in an embodiment as disclosed herein by building supervised Machine Learning (ML)/Deep Learning (DL) classification algorithms like Logistic Regression and Long Short-Term Memory (LSTM) recurrent neural network models for sequence classification. The LSTM models are capable of learning from internal representations of the time series data, effectively remembering over long sequences of input data and previous operation of the work machine (alone or in combination for example with other such work machines). The LSTM models may accordingly be trained on time series data from various sensors associated with the work vehicle 100 and observe loss and accuracy values over N training iterations, wherein losses are decreased and accuracy increased over time. The model may be described as classifying these time series data into defined work states.

In an embodiment, for generation of the model, the time series data may for example be streamed from the respective sensors/data sources on a work vehicle 100 (or a plurality of analogous work vehicles) via a communications network 224 onto a cloud server network, wherein the model is developed (i.e., trained and validated) by one or more processors at the cloud server level. Once the model has been sufficiently validated, it may be transmitted, for example via the communications network, and deployed by the controller 210 onboard a work vehicle 100 for subsequent work state estimation. The cloud server network may however continue to receive input time series data from the work vehicle 100 (or plurality of analogous work vehicles) for the purpose of further refining the model, wherein updated versions of the model may be transmitted to the work vehicle 100 periodically or on demand. In certain embodiments the model may itself, in accordance with methods as otherwise described herein, be at least in part implemented by the one or more processors at the cloud server level rather than fully by the controller 210.

With such a model being available to the controller 210, and upon receiving input signals from one or more appropriate sensors during a current work cycle, a current work state may accordingly be detected based on a comparison of the received input signals to the classified combinations of data (corresponding to the detected current work state), and the process is repeated when subsequent input signals correspond to a different one of the work states associated with the current work cycle.

In other embodiments, work state detection and corresponding transitions may be fixed algorithm- or rules-based, rather than relying on learning techniques. Accordingly, a specified input or combination of inputs may be predetermined as correlating to a work state, with this correlation being for example flagged for retrieval by the controller 210 upon identifying the specified input or combination of inputs.

In another step 330, the method 300 may include determining a current position of the work implement and/or working tool. In an embodiment, the current position of the work implement and/or working tool may be determined at least in part using output signals from one or more position (e.g., kinematic) sensors located on components of the work implement as described above.

As previously alluded to herein, the respective fields of view for the imaging devices may be blocked at various points along an available trajectory of movement for the work implement. When the work implement is in a fully elevated position for example (see FIG. 4A), in an embodiment only the bottom imaging device is selected (step 332) and may be relied upon for subsequent image processing and display steps. When the work implement is in an intermediate position (see FIG. 3A), in an embodiment each of the bottom imaging device and the upper imaging device may be selected (step 334) and image data therefrom may be fused or otherwise processed to generate a composite image for display. When the work implement is in a fully lowered position (see FIG. 2A), in an embodiment only the upper imaging device (step 336) is selected and may be relied upon for subsequent image processing and display steps.

In an embodiment, a combination of or transition between imaging devices 202, 204 during the intermediate position may take place based on any number of factors or triggers that are deemed appropriate for a given area of interest, work vehicle, work condition, or the like. For example, a transition from the upper imaging device 204 to the lower imaging device 202 (or vice versa) may in some embodiments only be performed at such times as the lower imaging device 202 is unable to capture the area of interest within its respective field of view 203, with such a determination being made dynamically for a given area of interest (which may for example be adjusted during operation by the operator or other authorized entity), work conditions, conditions of the imaging devices 202, 204, etc.

In another step 340, the method 300 may include image processing with respect to the image data from either or both of the imaging devices, as selected for example based on the current position of the work implement and accordingly a potential view of the area of interest. In an embodiment, the image processing may include cropping, resizing, spatial translation, perspective correction and image transformation, brightness and/or contrast adjustment to ensure matching of images from two or more image data sources, and the like for the purpose of generating display parameters that are substantially maintained throughout movement of the work implement, such that the operator is provided with a relatively steady view of the area of interest. For example, as the work implement 102 is raised from an initial (i.e., lowest) position, an area of interest even to the extent that it is still visible at all within the field of view 205 of the upper imaging device 204 would comprise a progressively smaller proportion thereof, whereas it is desired in such an embodiment to maintain a consistent display of the contours of the area of interest throughout such movement (step 350), and more particularly with respect to the otherwise consistent field of view 203 that would be available from the lower imaging device 202 at least while the work implement 102 is raised.

In an embodiment, display of an image including the area of interest (step 350) may be provided by converting the images from the one or more respective imaging devices 202, 204 as relevant for a particular position of the work implement 102 into a common display setting (i.e., having defined display parameters for the contours, perspective, resolution) and then selecting, excluding, fusing, and/or stitching of the images as needed to generate the display with the common display setting throughout motion of the work implement 102. In such an embodiment, the area of interest is not displayed as a virtual overlay with respect to a current (and dynamically changing) display setting as the work implement 102 moves, nor are images of the area of interest necessarily inferred or otherwise predicted and used to generate a virtual overlay with respect to a static display setting corresponding to the field of view of an operator within the operator cab, but a display including the area of interest may instead be based on actual images that are stitched and oriented according to a display setting which may be selectable or otherwise customized to an operator preference.

To facilitate such image processing, the method 300 may include (although not shown) receiving input signals from one or more kinematic sensors on the frame 132, work implement 102, and the like, and/or input signals from other components such as for example a central vehicle control unit or user interface, for the purpose of determining a position of the work implement 102 and the corresponding position of the upper imaging device 204 as it travels along its available trajectory of movement.

In an embodiment, models may be iteratively developed over time so as for example to correlate respective identified positions of the work implement 102 with respect to contours of a predetermined area of interest. In some cases, wherein the area of interest may be selectable or otherwise adjustable by users, alternative or additional models may be developed to provide appropriate corresponding image processing factors for a given position. Sufficiently developed models may then be retrievably selected for use based on a determined position in real time for dynamic image processing and compensation. Accordingly, in an embodiment, part of the image processing step may include or otherwise be facilitated by the retrieval (step 342) of one or more models and corresponding algorithms that have previously been developed to identify appropriate image processing parameters for each of various inputs including the image data for respective imaging devices, current positions of the work implement and/or working tool, work states, and optionally one or more work vehicle operating parameters, background conditions, environmental conditions, etc. The selected models may enable geometric and spatial translation of input image data. For example, mapping functions may be utilized to address varying orientations of the imaging devices 202, 204 and the corresponding fields of view 203, 205 and the requisite projective transformations to maintain a common viewing plane for display to users.

One of skill in the art may appreciate that additional image processing techniques may be employed to address visual distortions in the raw image data. For example, for imaging devices 202, 204 including ultra-wide-angle lenses the resultant image data may include barrel distortion effects dependent at least in part on the relative position of the area of interest within the respective overall field of view 203, 205, such that the area of interest appears to be larger when it is central to the field of view and smaller when it is more peripheral with respect to the field of view.

Exemplary algorithms associated with one or more of the aforementioned image processing techniques may in certain embodiments be developed and improved over time for particular positions and orientations of the respective imaging devices 202, 204 as part of the model development process, wherein processing requirements and the potential for error may desirably be minimized for subsequent iterations of the method.

In an embodiment (not shown), a generated display including or otherwise corresponding to an area of interest may further be selectively integrated with panoramic rearview images to obtain a complete surround view for the work vehicle 100, as may further be displayed for example as an overhead (e.g., "bird's eye") view of the work vehicle 100 and its surroundings. The stitched area of interest view as otherwise described herein and/or the surround/overhead view may be displayed upon operator selection or other determined triggers for presentation. For example, transition from one displayed view to another displayed view, or population of the display with more than one displayed view, may take place based on a detected obstacle within a threshold range of the work vehicle, a determined current position of the work implement, a determined work state, and the like.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of one or more functional components, logical components, and various processing steps, which may be comprised of one or more hardware, software, and firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Thus it is seen that systems, work vehicles, and/or methods according to the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments, unless otherwise specifically stated.

What is claimed is:

1. A method of visually representing at least a first area of interest proximate to a work vehicle during operative movement thereof,
   wherein the work vehicle comprises:
   a first portion comprising a frame supported by a plurality of ground engaging units;
   a second portion moveable relative to the first portion; and
   at least a first imaging device and a second imaging device mounted on the work vehicle, wherein at least one of the first and second imaging devices has a field of view including the at least first area of interest at any given time throughout the trajectory of movement of the second portion;
   the method comprising:
   selectively providing image data to a display unit representing the at least first area of interest and based on inputs from one or more of the at least first imaging device and second imaging device, wherein a display of the at least first area of interest is substantially maintained thereon throughout the trajectory of movement of the second portion;
   dynamically processing the image data based on a determined current position of the second portion along the trajectory of movement of the second portion, wherein the dynamic processing of the image data comprises dynamic cropping and resizing of the image data from the respective fields of view of at least one of the plurality of imaging devices and with respect to at least the first area of interest; and
   generating and iteratively updating a plurality of models corresponding to respective positions of the second portion throughout the trajectory, wherein the dynamic processing of the input data comprising dynamic cropping and further geometric and spatial translation of the input data is performed via selection of an appropriate model based on the determined current position of the second portion.

2. The method of claim 1, wherein:
   the second portion comprises a work implement supported by and movable relative to the frame, and configured to move a working tool at a distal end thereof between a ground-engaging position and a maximum elevated position at opposing ends of a trajectory of movement;
   at least the first imaging device is mounted in a location that remains static relative to the second portion during the movement of the working tool;
   at least the second imaging device is mounted on the second portion and moves along with the second portion during the movement of the working tool;
   image data provided to the display unit representing the at least first area of interest is based at least on inputs from the first imaging device while the working tool is at the maximum elevated position; and
   image data provided to the display unit representing the at least first area of interest is based at least on inputs from the second imaging device while the working tool is at the ground-engaging position.

3. The method of claim 2, comprising:
   determining an area of interest to be displayed on the display unit; and
   processing input data from the at least first imaging device and second imaging device to generate output signals corresponding to a representative display of the determined area of interest to a display unit, wherein image display parameters associated with perimeter contours of the first area of interest, at least while the first area of interest is the determined area of interest to be displayed on the display unit, are substantially maintained throughout the trajectory of movement of the second portion of the work vehicle.

4. The method of claim 3, wherein:
   the first area of interest comprises a portion of terrain proximate the working tool while the working tool is in the ground-engaging position.

5. The method of claim 3, wherein:
the first area of interest comprises threshold contours of a loading area to be cleared by the working tool during an unloading action by the work vehicle.

6. The method of claim 3, wherein:
the area of interest to be displayed on the display unit is automatically transitioned to the first area of interest upon detecting a first predetermined work state.

7. The method of claim 1, further comprising determining the current position of the second portion relative to the first portion in a local reference system via at least signals from one or more first kinematic position sensors mounted on the first portion of the work vehicle and one or more second kinematic position sensors mounted on the second portion of the work vehicle.

8. A work vehicle comprising:
a first portion comprising a frame supported by a plurality of ground engaging units;
a second portion moveable relative to the first portion;
a plurality of imaging devices mounted on at least first and second locations relative to the work vehicle, wherein throughout a trajectory of movement of the second portion of the work vehicle at least a first area of interest is within a respective field of view for at least one of the plurality of imaging devices; and
a controller in functional communication with the plurality of imaging devices to receive inputs therefrom, and configured to
selectively provide image data to a display unit representing the at least first area of interest and based on the received inputs from at least one of the plurality of imaging devices, wherein a display of the at least first area of interest is substantially maintained thereon throughout the trajectory of movement of the second portion,
dynamically process the image data based on a determined current position of the second portion along the trajectory of movement of the second portion, wherein the dynamic processing of the image data comprises dynamic cropping and resizing of the image data from the respective fields of view of at least one of the plurality of imaging devices and with respect to at least the first area of interest, and
generate and iteratively update a plurality of models corresponding to respective positions of the second portion throughout the trajectory, wherein the dynamic processing of the input data comprising dynamic cropping and further geometric and spatial translation of the input data is performed via selection of an appropriate model based on the determined current position of the second portion.

9. The work vehicle of claim 8, wherein:
the second portion comprises a work implement supported by and movable relative to the frame, and configured to move a working tool at a distal end thereof between a ground-engaging position and a maximum elevated position at opposing ends of a trajectory of movement;
at least a first imaging device of the plurality of imaging devices is mounted in a location that remains static relative to the second portion during the movement of the working tool;
at least a second imaging device of the plurality of imaging devices is mounted on the second portion and moves along with the second portion during the movement of the working tool;
image data provided to the display unit representing the at least first area of interest is based at least on inputs from the first imaging device while the working tool is at the maximum elevated position; and
image data provided to the display unit representing the at least first area of interest is based at least on inputs from the second imaging device while the working tool is at the ground-engaging position.

10. The work vehicle of claim 9, wherein the controller is configured to:
determine an area of interest to be displayed on the display unit; and
process input data from the at least first imaging device and second imaging device to generate output signals corresponding to a representative display of the determined area of interest to a display unit, wherein image display parameters associated with perimeter contours of the first area of interest, at least while the first area of interest is the determined area of interest to be displayed on the display unit, are substantially maintained throughout the trajectory of movement of the second portion of the work vehicle.

11. The work vehicle of claim 10, wherein:
the first area of interest comprises a portion of terrain proximate the working tool while the working tool is in the ground-engaging position.

12. The work vehicle of claim 10, wherein:
the first area of interest comprises threshold contours of a loading area to be cleared by the working tool during an unloading action by the work vehicle.

13. The work vehicle of claim 10, wherein:
the area of interest to be displayed on the display unit is automatically transitioned to the first area of interest upon detecting a first predetermined work state.

14. The work vehicle of claim 8, comprising one or more first kinematic position sensors mounted on the first portion of the work vehicle and one or more second kinematic position sensors mounted on the second portion of the work vehicle, wherein the controller is configured to determine the current position of the second portion relative to the first portion in a local reference system via at least signals from the one or more first kinematic position sensors and the one or more second kinematic position sensors.

* * * * *